(12) United States Patent
Kruckeberg

(10) Patent No.: US 8,290,796 B1
(45) Date of Patent: Oct. 16, 2012

(54) SYSTEM AND METHOD FOR REDUCING WORKER'S COMPENSATION INSURANCE REPORTABLE INCIDENTS

(76) Inventor: Richard W. Kruckeberg, Sullivan, IL (US)

(*) Notice: Subject to any disclaimer, the term of this patent is extended or adjusted under 35 U.S.C. 154(b) by 277 days.

(21) Appl. No.: 12/749,057

(22) Filed: Mar. 29, 2010

Related U.S. Application Data

(60) Provisional application No. 61/167,246, filed on Apr. 7, 2009.

(51) Int. Cl.
*G06Q 40/00* (2012.01)
(52) U.S. Cl. .......................................... 705/4
(58) Field of Classification Search ................ 705/4
See application file for complete search history.

(56) References Cited

U.S. PATENT DOCUMENTS 7,856,367 B2 * 12/2010 Shafer ............................. 705/4

* cited by examiner

*Primary Examiner* — Lindsay M Maguire
*Assistant Examiner* — James Vezeris
(74) *Attorney, Agent, or Firm* — Albert Bordas, P.A.

(57) ABSTRACT

A business method, and more particularly, a system and method for reducing worker's compensation insurance reportable incidents to identify sources of Worker's Compensation Insurance claims over a web based delivery system administered to employees. This allows for fewer reportable incidents to be presented by employees against their employer's Worker's Compensation Insurance policy. The system and method for reducing worker's compensation insurance reportable incidents allows corrections to be suggested to employees and employers prior to an occurrence of a reportable incident, which reduces the possibility of these claims occurring and thus lowers the cost of Worker's Compensation direct and indirect costs to the employer.

9 Claims, 1 Drawing Sheet

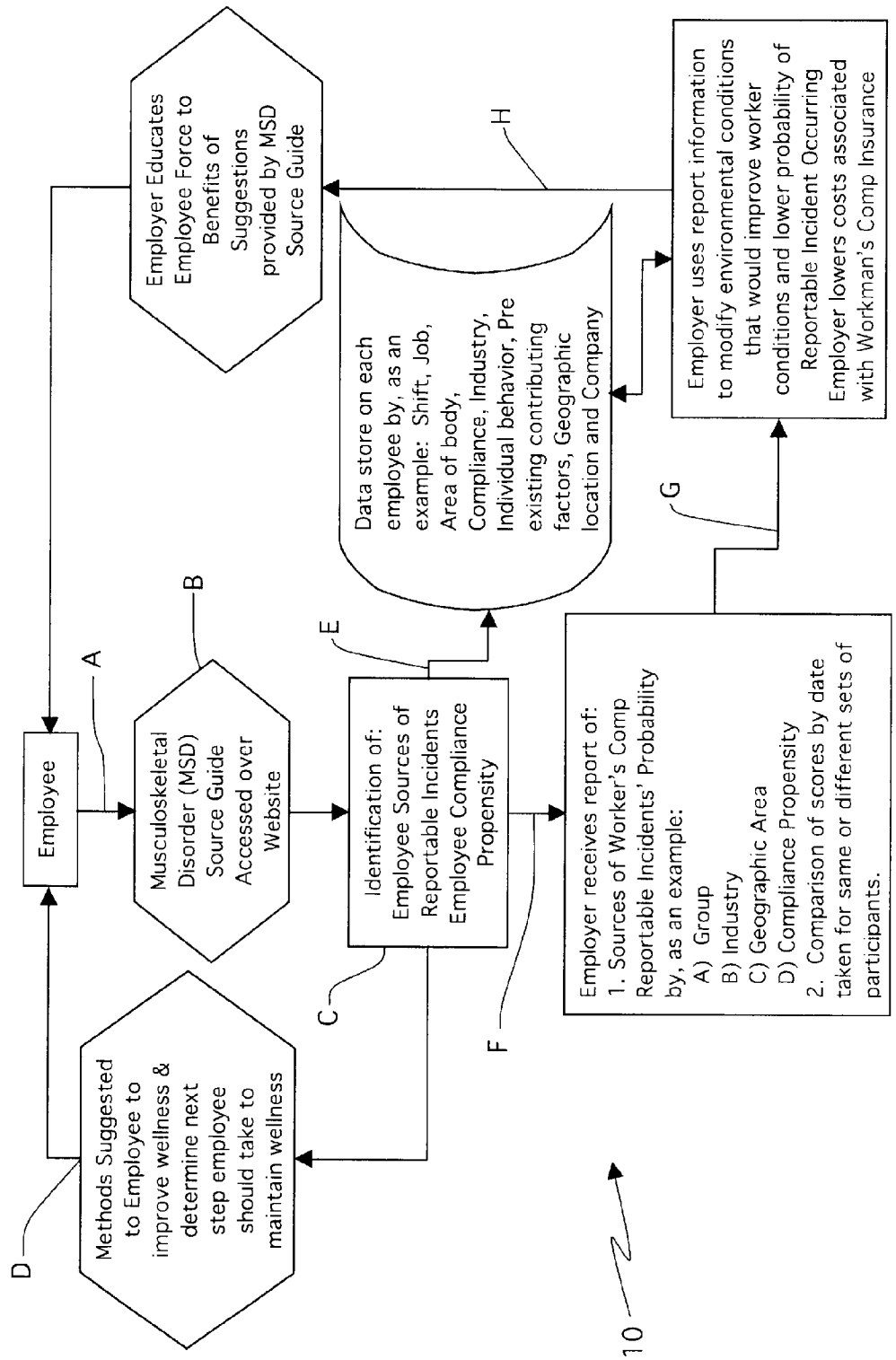

SYSTEM AND METHOD FOR REDUCING WORKER'S COMPENSATION INSURANCE REPORTABLE INCIDENTS

OTHER RELATED APPLICATIONS

The present application claims priority of Provisional Application No. 61/167,246, filed on Apr. 7, 2009, which is hereby incorporated by reference.

BACKGROUND OF THE INVENTION

1. Field of the Invention

The present invention relates to business methods, and more particularly, to a system and method for reducing worker's compensation insurance reportable incidents.

2. Description of the Related Art

Costs associated with Worker's Compensation Insurance significantly impact employers in the United States, as well as globally. Workers Compensation Insurance premiums are a direct cost to the employer, yet, the direct costs of Workers Compensation often represent only 20 to 30 percent of the overall injury expenses. A basic understanding of what determines the direct cost of Workers Compensation insurance is described: Unlike other insurance, Workers Compensation functions like a credit line to finance the costs of injuries. As such, rates alone do not determine the overall cost. An Experience Modification Factor (Mod) tailors the cost of insurance to the individual loss performance of an employer. A Workers Compensation premium is calculated by this formula: Rate× $100 Payroll×Experience Modifier.

The Mod calculation is complex. But an employer generally is compared with similar employers in the same industry classification, and if past losses are lower than average, a credit rating reduces the premium. Conversely, if past losses are higher than average, a debit rating can actually increase costs in spite of lower rates.

Indirect costs, including overtime, temporary labor, increased training, supervisor time, production delays, unhappy customers, increased stress, and property or equipment damage represent several times the direct cost of the injury. A 2002 Safety Index report by Liberty Mutual tallied the direct cost of US workplace injuries at $40.1 billion. The total financial impact of both direct and indirect costs in the US was estimated to be as much as $240 billion.

Injury costs, both direct and indirect, will have a much greater impact on employers' overall costs than Worker's Compensation Insurance rate decreases.

The current method for management of Worker's Compensation Insurance Reportable Incident (employees' claims) cost by employers involves multiple industry, location specific systems such as: bill review, medical case management and employee involvement and activism, including employee choice of care provider, as examples, whose compliance, dependent on local management participation. These methods are mainly evaluated by financial costs after the occurrence of the loss, based on the revenue for the plant or specific employer location.

There is no known process that allows a combination of the pre-emptive sourcing of Worker's Compensation Reportable Incidents to be gathered by employers. A preemptive process would aide in managing and modifying processes to reduce the Reportable Incidents prior to their conversion to an actual occurrence cost, and allow employees to access educational methods for improving their individual wellness. This process would further identify propensity of compliance by the employee, so as to allow further evaluation by the employer of the statistical probability of a Worker's Compensation Source of Reportable Incident occurring. The present invention can do this easily and economically.

By using Internet technology to access the invention in a non-obvious and novel method, an increase in revenue, a reduction in cost or an avoidance of cost can result for the employer, which uses the invention. A higher probability of an improvement in the return of investment results for the employer, and, a higher probability exists for the employee to avoid occurrence of a reportable incident as the invention assists the employee in identification of methods that can source areas where their individual wellness may improve.

SUMMARY OF THE INVENTION

The present invention provides an improved system and method for identifying sources, and recommending options to address correction of the sources' effect, in a company that may lead to employees' reportable incident claims against the employers' Worker's Compensation Insurance. This allows for lower costs, associated with Worker's Compensation, for the employer and more education to the employee of how to improve wellness for the employee. The present invention provides a system and method for employers to expedite access to data, which identifies these sources, using Internet based technologies. This would allow evaluation of the likelihood of a reportable incident at the employer site to be determined by: shift; job description; area of the body affected; compliance for improvements by employee; industry; geographic location; individual employee behaviors; and individual pre-existing ongoing contributory conditions. Further, the invention provides for a method of determining employee propensity to comply with suggestions that would improve the employee's wellness and lower the statistical probability of a reportable incident, by using novel and non-obvious systems that identify, through employees' responses to the invention's directions, the likelihood for an occurrence of the reportable incident.

The invention provides the method and system for determination of probable worker's compensation insurance reportable incidents to be administered to an employee in a manner flexible to schedules of employees. This is accomplished by being accessible for any employee at any time the employee is able to access the Internet, increasing the probability of use of the invention. This, also, allows multiple geographic locations globally for an employer to participate in use of the invention so as to have data accumulation occur for all sites that then allows for employer accessibility of reports at real time for the employers' management to act upon. Further, the present invention allows the accumulation of individual and group employee data for comparison of the employees' utilization of the invention's suggestions, which involve proven methods for musculoskeletal stretch and instructions presented in a novel method so as to accumulate data that allows a corresponding probability of a reportable incident occurrence to be determined by employee group or individual. Further, the ability for the invention to determine compliance by an employee in a process that is offered to the employee on line, allows the invention to be used in areas not limited to wellness program compliance determination, medical compliance determination and efficacy determination by providers.

It is therefore one of the main objects of the present invention to provide a system and method for reducing worker's compensation insurance reportable incidents.

It is yet another object of this invention to implement such a method and system that is inexpensive to maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a schematic view of the method for reducing worker's compensation insurance reportable incidents defined as the present invention.

DETAILED DESCRIPTION OF THE PREFERRED EMBODIMENT

Referring now to the drawing, the present invention is generally referred to with numeral 10 as a method for reducing worker's compensation insurance reportable incidents.

Seen in FIG. 1, is a system including a web based Musculoskeletal Disorder (MSD) Source Guide being administered to an employee at a computer logged on to an Internet site. This site is capable of directing the employee to sources of potential reportable incidents and educating the employee on methods to improve the wellness of the employee and allows employee responses to the respective questions they are presented in program instructions, to be sorted in unique and novel ways under groups that may represent employer, industry, geographic areas, job descriptions, shifts of work, areas where employee is concerned with wellness, previous behavior or conditions, and compliance with instructions. The data is further sorted and stored by means that are unique and novel to the invention so as to provide reports to employers that allow management of the sources of probable reportable incidents to be modified so as to reduce the likelihood of their occurrence prior to a direct and indirect cost being realized by the employer.

The present invention provides an improved system and method for initiating a preventative program of identifying sources of worker's compensation insurance reportable incidents so that costs and claims are reduced by the employer.

As seen in FIG. 1, the present invention addresses these issues by:

1. Placing the source of reportable incidents, the employee, into an interactive web based learning program (Item A, FIG. 1).
2. This learning program, identified as the Musculoskeletal Disorder (MSD) Source Guide incorporates unique and novel questions and suggested actions (Item B, FIG. 1) which will draw from the employee possible answers, lack of answers, delay of answers or avoidance of answers.
3. These employee decisions are then stored into databases (Item E, FIG. 1) and then analyzed by a unique and novel method automatically so as to indicate, by the employee's choices, the probability of a worker's compensation cost occurrence (Item C, FIG. 1).
4. Upon completion of the MSD Source Guide by the employee, another unique and novel aspect of the invention provides the employee with a report of what processes will improve their wellness (Item D, FIG. 1) with an incentive provided as a mechanism to improve the compliance propensity of the employee to follow the report suggestions.
5. In addition to the report provided to the employee, which includes various instructions to improve the individual's wellness, the employer is provided a report (Item F, FIG. 1). This report provides an overview of the likelihood, based on the MSD Source Guide responses of one or more than one individual per grouping parameters established by the employer, which will indicate to the employer what processes the employer may initiate or change in their areas of management so that employee reportable incidents can be reduced (Item G, FIG. 1).
6. The above-described information provides the employer with a baseline, which allows them to institute recommended education programs and ergonomic process changes that can improve worker environmental factors that may be sources for employee worker's compensation reportable incidents, thus lowering the costs for the employer.

Example of Invention's Affect

In an actual example of the application of the invention, the following occurred in a small manufacturing plant in east central Illinois:

1) In the year prior to MSD Source Guide methodology, total costs annually for direct and indirect Worker's Compensation were $294,800 for plant.
2) Factory had 114,000 square feet, 235 employees.
3) Metals Treatment, Rubber Molding, Finishing Systems produced.
4) Safety Facts: Two years prior to application of methodology of invention, total cases incidence rate was 13.7 and total lost time incidence rate was 11.6 The year prior to application of methodology of invention total cases incidence rate was 14.7 and total lost time incidence rate was 13.7. The year during application of methodology of invention total cases incidence rate was 8.6 and total lost time incidence rate was 5.6. Total cases incidence rate average for industry (SIC 3061) was 8.5 and average industry total lost time incidence rate was 5.3.
5) The present invention was applied during 8 different periods over year and took 4 hours per application; 32 total employees participated, 16 different employees identified as posing risk of reportable incident occurring as a result of their source guide responses.
6) Average cost per claim two years prior to application of methodology of invention, $9,652; One year prior to application of methodology of invention, $7,237; Year during application of methodology of invention, $858.
7) Direct Cost (32%) Indirect Cost (68%) TOTAL
Before Invention
Application $110,000 $184,800 $294,800
After Invention
Application $73,358 $123,241 $196,599
Savings $36,642 $61,559 $98,201
8) Cost of Application of Invention Methodology $3,040.

Therefore, more specifically, instant invention 10 is a method for reducing worker's compensation insurance reportable incidents, comprising the steps of:

A) placing an employee, as a source of reportable incidents, onto a computer having an interactive web based learning program;

B) capturing data corresponding to said employee responses onto said computer, said data comprises correctly answering questions and suggested actions of said interactive web based learning program, lack of answers to said questions and said suggested actions, delaying said answers to said questions and said suggested actions, and/or incorrectly answering said questions and said suggested actions mandated by said interactive web based learning program;

C) storing said data corresponding to said employee responses onto said computer;

D) analyzing said data corresponding to said employee responses onto said computer to calculate a probability of a worker's compensation cost occurrence;

E) generating a first report for said employee corresponding to said employee responses of what processes will improve said employee wellness with an incentive provided as a mechanism to improve compliance propensity of said employee to follow said first report suggestions;

F) generating a second report for an employer corresponding to said employee responses of what processes will improve said employee wellness with said incentive provided as said mechanism to improve said compliance propensity of said employee following said first report suggestions, said second report also comprises an overview of a likelihood, based on said data of one or more said employees per grouping parameters established by said employer, which will indicate to said employer what processes said employer can initiate or change in areas of management to reduce employee reportable incidents to define a baseline; and G) instituting recommended education programs and ergonomic process changes to improve worker environmental factors as sources for said employee worker's compensation reportable incidents to lowering costs for said employer. The method for reducing worker's compensation insurance reportable incidents further comprising the steps of:

H) accumulating recognized published studies that analyze odds ratio of a behavior or physiological trait which is exhibited by said employees that historically resulted in said worker compensation claim;

I) forming a numeric assignment to each of said odds ratio of a behavior or said physiological trait, based on a product of said odds ratio and percent occurrence sited in studies utilized for each specific trait or behavior listed in a source guide survey;

J) assigning said numeric assignment to said employee, based on said employee responses;

K) accumulating each said employee's numeric scores and dividing them into a sum total of all potential numbers assigned to each question in said source guide;

L) placing individual said employee weighted score in groups so as to avoid individual evaluations; and M) providing group, aggregated weighted scores to said employers that ascertain a relative risk of a worker compensation claim from known historic studies results that allow objective evaluation of where to support as an example education, ergonomic or supervisory training resources that may decrease a risk or prevent worker compensation injuries or claims from occurring in a future.

Analyzing of step D) above, comprises a source guide that provides an accumulation of results from published studies that indicate a likelihood of an individual's psychological or physiological traits historically occurring in worker compensation claims, two attributes in said published studies used in a source guide calculation are odds ratios, assigned to these behaviors or traits, and their percent occurrence, inferred in said published studies samplings to an entire population of workers, each identifier listed in said published studies is assigned a numeric value in said source guide that corresponds to said capturing data by said employee and is accumulated and divided by a potential total sum of all said source guide questions, this calculation results in said alert scores that are a numeric representative of said employee's behaviors as well as physiological tendency's, correlated to published studies which reflect various odds and percentage occurrences that these unique assessments have, turning into a worker compensation cost, accumulative said alert scores objectively measure potential worker compensation costs with a degree of confidence that is reflected in the studies sited.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for reducing worker's compensation insurance reportable incidents, comprising the steps of:

A) placing an employee, as a source of reportable incidents, onto a computer having an interactive web based learning program;

B) capturing data corresponding to employee responses onto said computer, said data comprises correctly answering questions and suggested actions of said interactive web based learning program, lack of answers to said questions and said suggested actions, delaying said answers to said questions and said suggested actions, and/or incorrectly answering said questions and said suggested actions mandated by said interactive web based learning program;

C) storing said data corresponding to said employee responses onto said computer;

D) analyzing said data corresponding to said employee responses onto said computer to calculate a probability of a worker's compensation cost occurrence; and E) generating a first report for said employee corresponding to said employee responses of what processes will improve said employee wellness with an incentive provided as a mechanism to improve compliance propensity of said employee to follow said first report suggestions; and F) generating a second report for an employer corresponding to said employee responses of what processes will improve said employee wellness with said incentive provided as said mechanism to improve said compliance propensity of said employee following said first report suggestions, said second report also comprises an overview of a likelihood, based on said data of one or more said employees per grouping parameters established by said employer, which will indicate to said employer what processes said employer can initiate or change in areas of management to reduce employee reportable incidents to define a baseline.

2. The method for reducing worker's compensation insurance reportable incidents set forth in claim 1, further comprising the step of:

G) instituting recommended education programs and ergonomic process changes to improve worker environmental factors as sources for said employee worker's compensation reportable incidents to lowering costs for said employer.

3. The method for reducing worker's compensation insurance reportable incidents set forth in claim 2, further comprising the step of:

H) accumulating recognized published studies that analyze odds ratio of a behavior or physiological trait which is exhibited by said employees that historically resulted in said worker compensation claim.

4. The method for reducing worker's compensation insurance reportable incidents set forth in claim 1, further characterized in that said analyzing comprises a source guide that provides an accumulation of results from published studies that indicate a likelihood of an individual's psychological or physiological traits historically occurring in worker compensation claims, two attributes in said published studies used in a source guide calculation are odds ratios, assigned to these behaviors or traits, and their percent occurrence, inferred in said published studies samplings to an entire population of workers, each identifier listed in said published studies is assigned a numeric value in said source guide that corresponds to said capturing data by said employee and is accumulated and divided by a potential total sum of all said source guide questions, this calculation results in said alert scores that are a numeric representative of said employee's behaviors as well as physiological tendency's, correlated to published studies which reflect various odds and percentage occurrences that these unique assessments have, turning into a worker compensation cost, accumulative said alert scores objectively measure potential worker compensation costs with a degree of confidence that is reflected in the studies sited.

5. The method for reducing worker's compensation insurance reportable incidents set forth in claim 3, further comprising the step of:
   I) forming a numeric assignment to each of said odds ratio of a behavior or said physiological trait, based on a product of said odds ratio and percent occurrence sited in studies utilized for each specific trait or behavior listed in a source guide survey.

6. The method for reducing worker's compensation insurance reportable incidents set forth in claim 5, further comprising the step of:
   J) assigning said numeric assignment to said employee, based on said employee responses.

7. The method for reducing worker's compensation insurance reportable incidents set forth in claim 6, further comprising the step of:
   K) accumulating each said employee's numeric scores and dividing them into a sum total of all potential numbers assigned to each question in said source guide.

8. The method for reducing worker's compensation insurance reportable incidents set forth in claim 7, further comprising the step of:
   L) placing individual said employee weighted score in groups so as to avoid individual evaluations.

9. The method for reducing worker's compensation insurance reportable incidents set forth in claim 8, further comprising the step of:
   M) providing group, aggregated weighted scores to said employers that ascertain a relative risk of a worker compensation claim from known historic studies results that allow objective evaluation of where to support as an example education, ergonomic or supervisory training resources that may decrease a risk or prevent worker compensation injuries or claims from occurring in a future.

* * * * *